United States Patent [19]

Reilly et al.

[11] Patent Number: 4,958,375
[45] Date of Patent: Sep. 18, 1990

[54] PARALLEL, MULTI-UNIT, ADAPTIVE PATTERN CLASSIFICATION SYSTEM USING INTER-UNIT CORRELATIONS AND AN INTRA-UNIT CLASS SEPARATOR METHODOLOGY

[75] Inventors: Douglas L. Reilly, Providence; Christopher L. Scofield, Barrington; Leon N. Cooper; Charles Elbaum, both of Providence, all of R.I.

[73] Assignee: Nestor, Inc., Providence, R.I.

[21] Appl. No.: 156,830

[22] Filed: Feb. 17, 1988

[51] Int. Cl.$^5$ .............................. G06K 9/62
[52] U.S. Cl. .............................. 382/14; 382/36
[58] Field of Search .................. 382/14, 15, 36, 38, 382/39, 37, 30; 364/715, 900

[56] References Cited

U.S. PATENT DOCUMENTS

| | | | |
|---|---|---|---|
| 3,601,802 | 8/1971 | Nakagome et al. | 382/37 |
| 3,950,733 | 4/1976 | Cooper et al. | 382/15 |
| 4,030,068 | 6/1977 | Banz | 382/38 |
| 4,044,243 | 8/1977 | Cooper et al. | 364/900 |
| 4,254,474 | 3/1981 | Cooper et al. | 364/900 |
| 4,326,259 | 4/1982 | Cooper et al. | 382/15 |
| 4,760,604 | 7/1988 | Cooper et al. | 382/15 |

OTHER PUBLICATIONS

Batchelor, Bruce G., "*Practical Approach to Pattern Classification*", (London & N.Y.: Plenum Press, 1974), pp. 35-147, 175-208.

Batchelor, Bruce G., "*Pattern Recognition: Ideas in Practice*", (London & N.Y.: Plenum Press, 1978), pp. 67-116.

Udagawa et al., "A Parallel Two-Stage Decision Method for Statistical Character Recognition . . . ", *Electronics & Comm. in Japan*, vol. 33, 9/1965, pp. 37-46.

J. Schurmann, "Zur Zeichen Und Worterkennung Beim Automatischen Anschriftenlesen", *Wissenschaftlcht. Berichte*, vol. 52, No. 1/2 (1979), pp. 31-38.

Primary Examiner—Leo H. Boudreau
Attorney, Agent, or Firm—Karl F. Milde, Jr.

[57] ABSTRACT

A system is disclosed for separating and identifying classes of patterns or events which are not necessarily linearly separable. The patterns are represented by an input signal S. The system comprises (1) a plurality of classification units, connected in parallel to receive the input signal S and (2) a class selection device, responsive to the output signals produced by the classification units, for producing a single output response R representing the class of each respective pattern. At least some of the pattern classification units include generalizer units having a memory for storing a number of generalizer "prototypes" and a comparator for comparing the vector location of an input pattern with each of the generalizer prototypes.

19 Claims, 7 Drawing Sheets

PARALLEL, MULTI-UNIT, ADAPTIVE PATTERN CLASSIFICATION SYSTEM USING INTER-UNIT CORRELATIONS AND AN INTRA-UNIT CLASS SEPARATOR METHODOLOGY

REFERENCE TO RELATED PATENTS AND PATENT APPLICATION

The subject matter of this patent application is related to that of the commonly-owned U.S. Pat. Nos. 3,950,733; 4,044,243; 4,254,474 and 4,326,259, all to Cooper et al., and to the patent application Ser. No. 775,144 of Copper et al., for "Parallel, Multi-Unit, Adaptive, Nonlinear Pattern Class Separator and Identifier," all of which are incorporated herein by reference.

1. Field of the Invention

This invention relates to adaptive information processing systems. More particularly, it relates to self-organizing input-output devices which function to separate and identify classes of patterns including those that are not linearly separable.

2. Background of the Invention

The above-referenced patents and patent application to Cooper et al. disclose methods and apparatus (systems) that can learn to classify "patterns" or real world "events" even when representations of the same are not linearly separable. The patterns or events are detected by some data acquisition device and encoded into a set of measurements or features the results of which are represented by the signal S, comprised of individual signals $s_1, s_2, \ldots s_k$. The signal S could be, for example, a signal coming from a camera registering a scene (pattern), or the output of a microphone detecting some sound (pattern), or from a data base representing events, historical records, etc. (abstract patterns).

In a system comprising a Nestor ® Adaptive Module as described in these patents, all input signals S (which are themselves referred to herein as "patterns") belonging to the same class should elicit the same final response from the system. For example, in an application such as character recognition, any version of a hand-drawn "2" seen by the system should result in an output signal which causes the character font member for "2" to be displayed on some output device, video screen, printout, etc.

A system of this type is an extremely powerful pattern class separator and identifier. The system can be trained by a learning procedure which does not require the operator to specify the (possibly) complex geography of the pattern class in the multidimensional pattern space in which the input event is represented. In such a system the input event S is preprocessed into an intermediate signal F representing only certain prescribed features of the original pattern. Subjecting the input signal S (representing the pattern) to this preprocessing step—referred to herein as encoding—should preserve enough information to permit patterns to be distinguished from each other. Information irrelevant for learning one class may be important to distinguish some other class. For this reason, it may be difficult to choose a single preprocessing strategy that removes all irrelevant information without jeopardizing the ability to distinguish some classes.

The above-referenced patent application Ser. No. 755,144 for "Parallel, Multi-Unit, Adaptive, Nonlinear Pattern Class Separator and Identifier" describes a multi-unit Nestor System ® which can be regarded as a way of linking together a number of Nestor Adaptive Modules. Each component Nestor Module can be considered as a complete unit, including its own preprocessing and encoding procedures. A pattern is identified by the response it produces among these component units. Each unit has its own encoding procedures, different from that of any other. A unit's encoding procedures define its code space. It is sensitive to certain types of information in the input signal. The particular set of features it registers may give it a special aptitude for learning some types of pattern classes, but not others. To the extent that a class is well separated from all others in the pattern space of a given unit and to the extent that it is not widely distributed throughout that space, then that unit will have a natural "aptitude" for learning this class. At the same time, learning other pattern classes may require pooling the resources of several component units, none of which alone has sufficient discriminating skills, by virtue of its preprocessing and encoding properties, to distinguish these classes. In this case the system identifies an example of such a class by correlating the responses of a set of units.

The multi-unit Nestor System disclosed in the above patent application is organized to first attempt separation of pattern classes within individual code spaces and secondly, for those classes for which that is not possible, to subsequently correlate the responses of multiple units to produce an identification. Such a system works best when, within the pattern spaces of the various events, class distributions are largely (but not necessarily wholly) non-overlapping. For the non-overlapping regions of the various class territories, effective mapping of the areas ("covering" with "influence fields" of Nestor Adaptive Module "prototypes") can be rapidly achieved by showing the system a suitable training set of patterns that is a representative sample of the classes in question. Those portions of a class territory that overlap with some other class (or classes) must still be properly mapped out ("covered"). This territory must be mapped out for each of the classes laying claim to it in the pattern space. If this is done and the pattern spaces of the various units in the multi-unit system are sufficiently different from one another (ideally, but not necessarily, orthogonal) then the overlapping class regions of one pattern space will not be reproduced in some other. (Two pattern spaces are orthogonal if, for any event, its representation in one space is completely uncorrelated with its representation in the other space.) Accordingly, correlation of unit responses from multiple units will serve to identify the pattern. As an example of multi-unit correlation, consider a two unit system in which Unit 1 ($U_1$) had degenerate class territories for classes A and B while Unit 2 ($U_2$) had degenerate regions for B and C. An example of a class B pattern would result in the "confused" responses A or B from $U_1$ and B or C from $U_2$, which could be correlated to produce the identification B.

When, within the various unit pattern spaces, class regions are largely overlapping rather than largely separated, the multi-unit Nestor System disclosed in the above referenced patent application will eventually learn to separate the classes but may require long training times and large numbers of prototypes. This is due to the fact that in some cases the act of separating class territories results in their being covered by many prototypes, each of which maps out an amount of the class region that is small relative to the size of the total class territory. This results in long training times for the system to achieve robust performance on the problem.

SUMMARY OF THE INVENTION

A principal object of the present invention is to provide a pattern class separator and identifier which can separate and identify classes of patterns having a wide variety of salient features.

Another object of the present invention is to provide a pattern class separator and identifier which can separate and identify classes of patterns which may have only small and subtle differences between them.

Still another object of the present invention is to provide a specific software-implemented embodiment of the present invention which is capable of achieving the objects stated immediately above.

These objects, as well as further objects of the present invention that will become apparent from the discussion that follows, are achieved, according to the present invention, by providing a pattern classification and identification system comprised of (a) a plurality of classification units, connected in parallel and which receive an input signal S, representing each pattern, and (b) a class selection device (CSD), responsive to the output signals produced by the classification units, for producing a single output response R representing the class of each respective pattern.

The classification units include both "generalizers" and "separators" which store "generalizer prototypes" and "separator prototypes," respectively. The system operates to compare each input pattern, first to the generalizer prototypes to determine whether such pattern falls within the region of influence of at least one generalizer prototype. If a unique and certain response to a particular input pattern cannot be produced by such comparison, the system compares such input pattern with the separator prototypes to determine whether the input pattern falls within a region of influence of at least one of these separator prototypes.

The system, according to the present invention, is a modification of the multi-unit Nestor System disclosed in the above-referenced patent application Ser. No. 775,144. This system is called "GENSEP" for "generalizer/separator." In the GENSEP system, the individual units train first to develop mappings that cover the class territories with prototypes called generalizers. Generalizer prototypes are not explicitly configured to achieve separation of classes in the code space of a unit. Rather, the system correlates the multi-unit responses of firing generalizers to achieve class separation. Another class of prototypes, called separators, develop in the system to effect class separation based upon feature subsets of the generalizer coding units.

Because the system is not attempting separation in the generalizer coding units, class coverings develop more rapidly, more robustly and with fewer numbers of prototypes. This improves the system's ability to produce identifications through the correlations of different units' responses, provided the units are not identical in terms of the feature measurements they apply to characterize the input event. When correlations among units cannot resolve a pattern class, then appeal is made to the separator prototypes that carry a subset of the input information that may serve to distinguish one class from another. Very often, enough "generalizing" units can be defined so that the response derived from correlating all such units can reduce the number of tentative classifications to two or at worst three. (This has been observed for online character recognition for the Western alphanumeric characters.) Then it is a simple matter of extracting from the generalizing units the appropriate separating feature along which pattern distinctions can reliably be made. In GENSEP we introduce a mechanism for committing separator prototypes that embody class distinctive features. In fact, a number of such separator prototypes are defined and training selects separators that are most effective for the kinds of class separation required. The separating prototypes can be viewed as implementing "rules" for disambiguating confusions; the system learns to formulate these rules as required. In this way the separator prototypes can distinguish classes of patterns which may have only small and subtle differences between them.

For a full understanding of the present invention, reference should now be made to the following detailed description of the preferred embodiments of the invention and to the accompanying drawings.

DESCRIPTION OF THE PREFERRED EMBODIMENTS

The present invention and its preferred embodiments will now be described with reference to FIGS. 1–5 of the drawings.

A. System Organization Units and Prototypes

Figure 1:
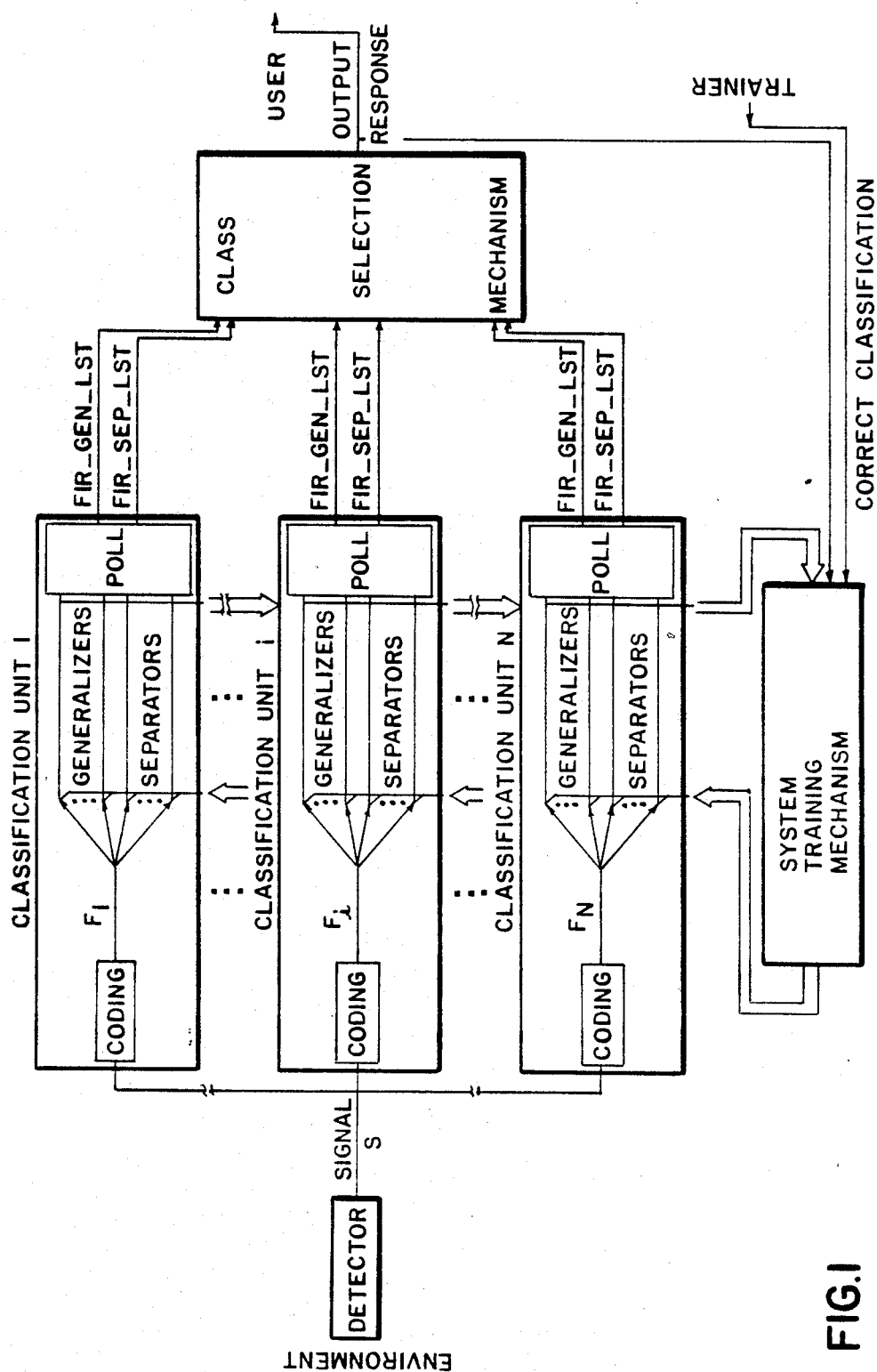
FIG. 1 is a block diagram of a parallel, multi-unit, adaptive pattern classification system using inter-unit class correlations and an intra-unit class separator methodology according to the present invention.

In a preferred embodiment of the GENSEP system according to the present invention, as illustrated in FIG. 1, each classification unit U includes both (1) a pattern feature encoding device, responsive to the input signal S, for producing an intermediate signal F representative of the features contained in the pattern, and (2) a pattern classifier response to the signal F, for producing an output signal R representative of the respective class of the pattern, as identified by the features encoded by the feature encoding device.

Each classification unit $U_i$ sees an input S (the output of the data acquisition device, or devices, characterizing the input event) and can apply a "code" to the signal to extract from it a set of values $F_1 \ldots F_k$. As in the Nestor Adaptive Module as disclosed in the above-referenced patents, the unit operates to compare the incoming pattern vector F to a set of prototypes $P^j$, $j=1 \ldots N$. This produces an output classification R which is indicative of the prototype or prototypes (if any) that respond to or match the pattern vector F. As each Nestor Adaptive Module is trained, it develops a unique set of prototypes for classification of incoming patterns.

Two types of prototypes develop during training in the Nestor Adaptive Modules of a GENSEP system: generalizer prototypes and separator prototypes. Generalizer prototypes are committed to the memory assigned to a particular unit in order to cover class territories as represented in that unit's coding space. Separator prototypes are committed between certain pairs of generalizer prototypes in order to separate class confusions that can be discriminated on the basis of appeal to a small subset of information in the code space of the given unit.

Thus two types of mechanisms are available for class separation in the GENSEP system. Initial discriminations are made on the basis of correlating the responses of many different units, which responses are the result of activity (firing) among generalizers only in the units. Further class discrimination is made by appealing to the classes represented among firing separator prototypes in each unit. These mechanisms allow the system to train rapidly to make appropriate generalizations about a class of patterns and to further refine its ability to distinguish that class of patterns from all others either by correlating large numbers of feature measurements or by defining precise individual feature values for discrimination.

B. Memory

B1. The "Prototype"

As described in the U.S. Pat. No. 4,326,259, memory in a Nestor System is composed of "prototypes." Each prototype has some number of input lines and one output pathway through which it communicates with other elements in the system. There are two different types of prototypes in the system: generalizer prototypes and separator prototypes.

B2. Generalizer Prototypes

Each generalizer prototype has associated with it a set of weighting factors (one for each input line), the prototype vector, P, and a threshold $\theta$, governing whether it is "on" or "off" (firing or not firing) in response to an input pattern. The threshold defines a "region of influence" for the prototype. The region of influence is the set of all input events which will cause the prototype to o fire. This threshold may be modifiable. If modifiable, it is adjusted so as to gradually increase the size of the prototype region of influence, but it is typically not beyond some fixed percentage of the dimensionality of the code space (ranging approximately from 5 percent to 50 percent). Each generalizer prototype has a class, C, associated with it. Finally, each generalizer prototype belongs to a particular unit in the system. The unit is specified by an index u. Thus, the data set defining a generalizer prototype consists of [P; $\theta_g$; C; u].

B3. Separator Prototypes

Like a generalizer prototype, each separator prototype has associated with it a set of weighting factors (one for each input line), the prototype vector, S, and a threshold $\theta_s$, partially governing whether it is "on" or "off" in response to an input pattern. As with generalizer prototypes, this threshold defines a "region of influence" for the separator. This threshold is modifiable and adjusted by the system in such a way as to decrease the size of the influence field of the separator. Separators whose influence field is below some minimum size are considered phase II (P2) separators; those above the minimum are called phase I (P1) separators. This distinction between the two types of separators lies primarily in the extent to which they can influence the classification of the pattern within a given unit of the system.

Additionally, each separator is associated with a pair of generalizers, (i, j). More than one separator may be associated with the same generalizer pair. Each separator has associated with it an index, k, specifying a portion of the code values of the pattern space holding the generalizer prototypes with which it is associated. In particular, if a given code space represents the pattern event in terms of measurements $F_1 \ldots F_m$, then the index associated with a separator will be some number k on the interval (l, m).

Finally, each separator has a class associated with it. Unlike the class association of a generalizer, the association of a class with a separator is a negation. In particular, if a generalizer prototype for class C fires in response to an input event, the system will tend towards the assignment of class C to the pattern. However, if a separator for class C fires in response to the pattern, the system will tend not to assign C as an identification of the pattern. Briefly, if a generalizer for C fires, it says "C"; if a separator for C fires, it is saying "not C."

Thus, the set of data defining a separator can be listed as [i;, j; k; S, $\theta_s$;C].

C. Comparing a Pattern with Prototypes

Presented below is the procedure, according to the present invention, for comparing a pattern with a prototype in system memory. Since generalizer and separator prototypes have different properties, the procedures for comparing a pattern with a generalizer and a separator prototype are discussed separately. These procedures determine whether or not the prototype in question will fire in response to the pattern.

C1. Pattern—Generalizer Comparison

An input pattern appears to a generalizer prototype as a set of signals occurring on its N input lines. The operation of comparing a pattern and a generalizer prototype can take any of several forms depending on whether the input signals to the prototype are binary or continuous valued. Either type of signal can be processed. For brevity we review here only the procedure for pattern-generalizer comparison for the case of binary valued signals arriving on the N input lines of the generalizer. In this case the prototype weighting factor assigned to that line is itself a binary number. The total prototype activity is a count of the number of input lines on which the bit value of the pattern signal, $f_j$, does not match the bit value of the weighting vector, $P_j$.

$$d = \sum_{j=1}^{N} u_j$$

where $u_j = 1$ if Bit $(f_j) \neq$ Bit $(P_j)$ $= 0$ otherwise

This total number of unmatched bits is compared against the prototype threshold. If the unmatched bit count is less than the threshold, the generalizer fires; if it is greater than or equal to the threshold, the prototype is silent. Thus, $$d < \theta \text{ prototype fires}$$
$$d \geq \theta \text{ prototype silent}$$

As has been noted in above-referenced patent application, the operations of comparing a pattern with a set of prototypes can occur in parallel; that is to say, the comparison of a pattern with each prototype can occur simultaneously. Additionally, in the comparison of a pattern with a given prototype, the operation performed on a given input line (bit comparison for binary valued inputs or multiplication for continuous valued signals) can be performed simultaneously on all input lines. This rich parallelism is an inherent feature of the Nestor System.

C2. Pattern—Separator Comparison

To review, the data structure of a separator is $S=[i, j; k; S, \theta_s; C]$. Pattern processing by separator prototypes is similar to that by generalizers. A set of signals occurring at the M input lines of the separator prototype are compared with the separator weighting factor values, an unmatched bit count is determined and tested against the separator theshold. However, the generalizers with which the separator is paired and the feature index k further define the operation of the separator on the pattern. For clarity, we assume that the feature values $[F_1 \ldots F_k]$ defining the code vector for the pattern in the unit are the continuous, real-valued representation and that the binary equivalent of this, the set $[B_i]$, $i=1, \ldots M$ is the information appearing at the input lines of the generalizer. Then the feature index, k, associated with the separator specifies a member of the continuous-valued set F. The binary equivalent of $F_k$ will appear as input to the separator S. Specifically, let B be a binary mapping that converts $F_k$ to a binary valued vector $(b_1 \ldots b_m)$. Then the separator unmatched sign count is determined as $$d = \sum_{j=1}^{m} u_j$$

$$u_j = 1 \text{ if } S_j \neq b_j$$
$$= 0 \text{ otherwise}$$

Finally, for a separator to fire, the following conditions must hold:

(1) $d < \theta_s$ (separator threshold condition)
(2) $P_i$ is firing (associated generalizer prototypes are firing)
(3) $P_j$ is firing Note that both generalizers paired with the separator in question must be firing for the separator to fire.

D. Determining the System Response

D1. Unit Response to a Pattern

The response of a unit to an incoming pattern consists of the classes associated with its firing prototypes. In particular, those classes are organized into two lists, the generalizer class list and the separator class list. Obviously, due to the conditions required for separator firing, if the generalizer class list of a given unit is empty, the separator class list for that unit will be empty as well.

D2. System Response to the Pattern

Figure 2A:
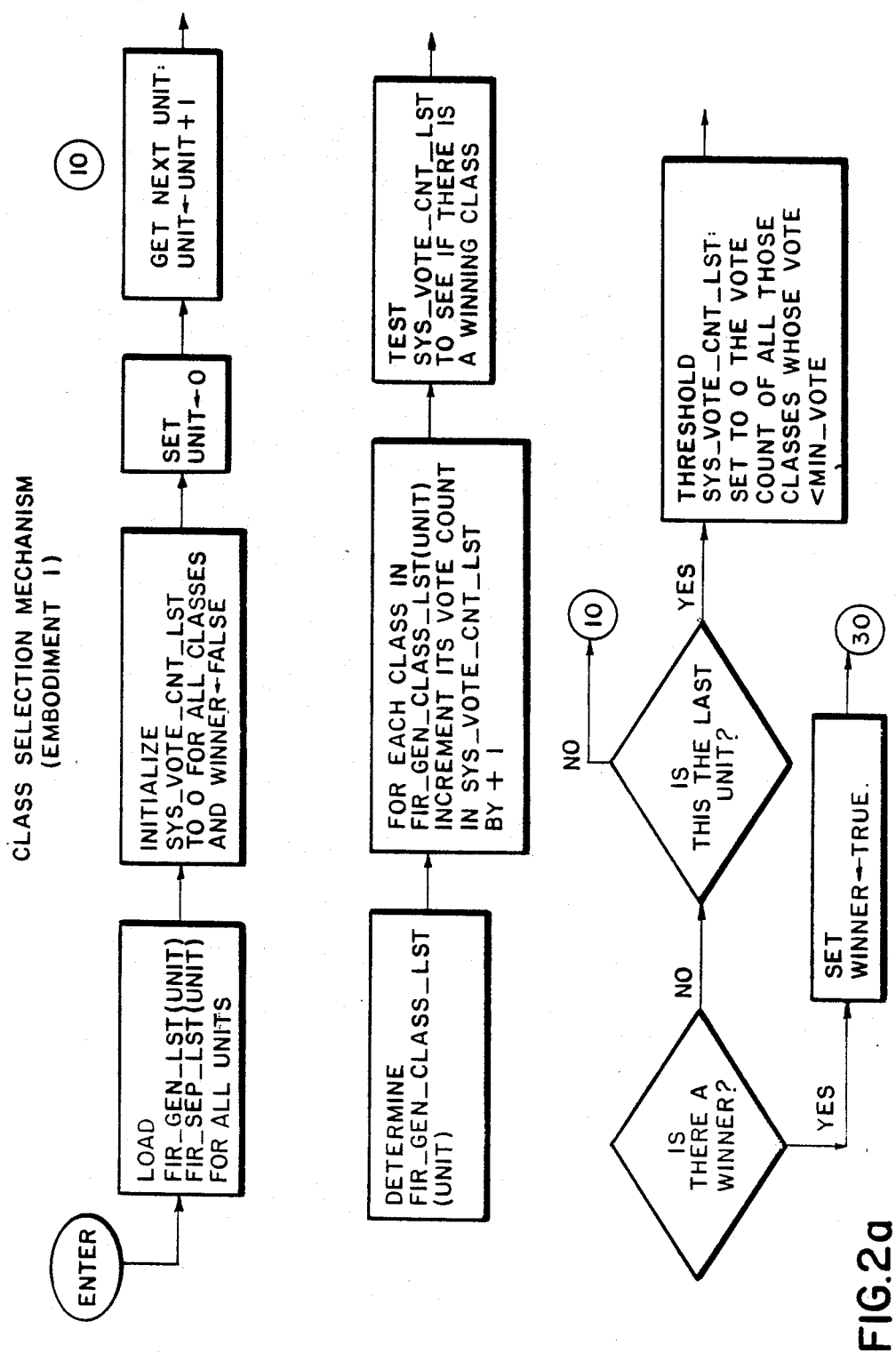
FIG. 2 (comprised of FIGS. 2a and 2b) is a flow diagram depicting an algorithm for a software system (Nestor System ®) implementing the adaptive pattern classification system of FIG. 1 according to a first preferred embodiment of the present invention.
Figure 2B:
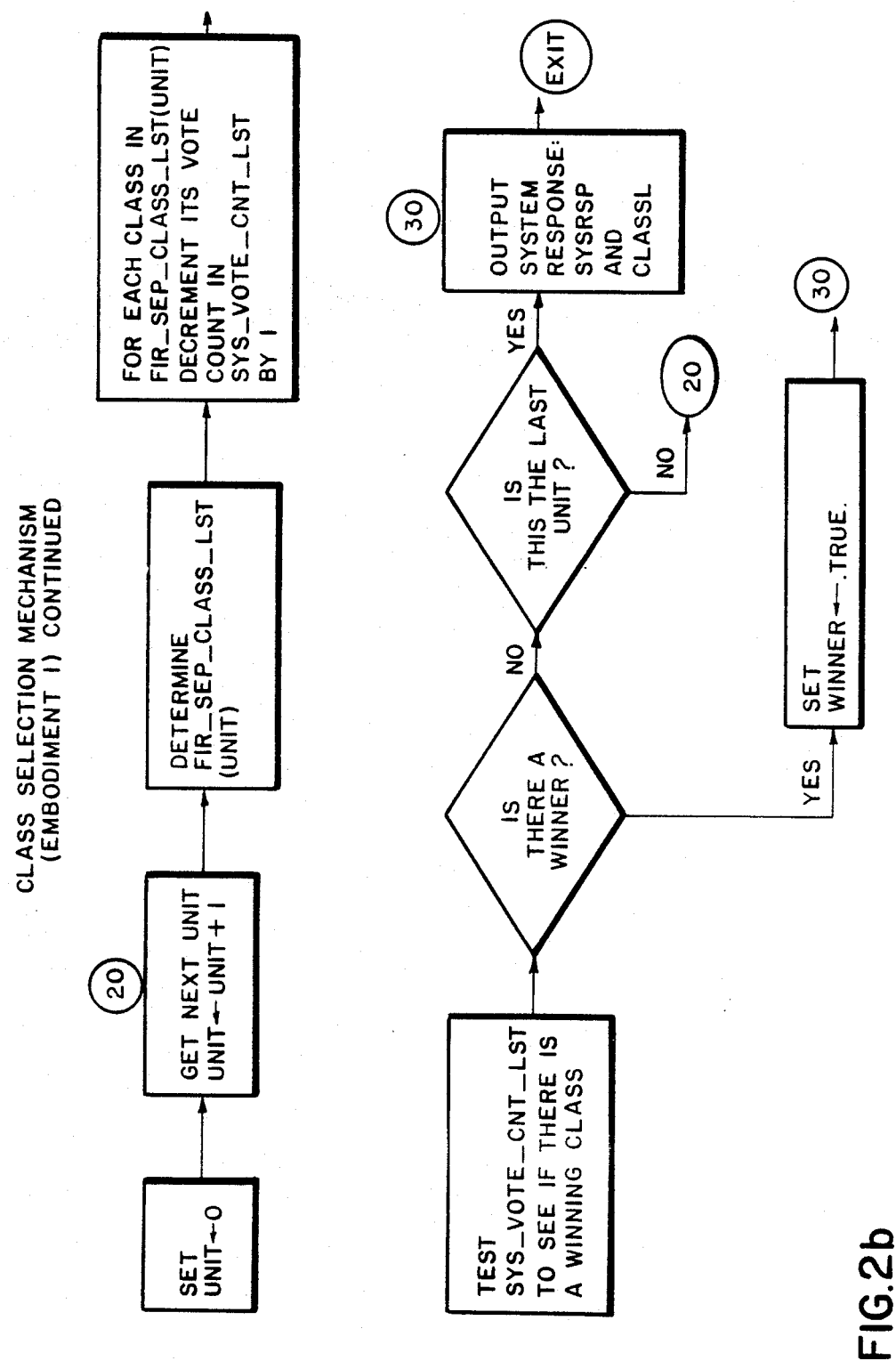

The system response to an incoming pattern is determined by the Class Selection Mechanism (CSM) as a function of the output class lists (from both generalizers and separators) of the system units. The CSM can evaluate the contents of the class lists of all units in a variety of ways as a function of unit priority. Two preferred embodiments of the class selection mechanism are illustrated in FIGS. 2 and 3, respectively.

As in the multi-unit system described in the abovereferenced patent application, units in the GENSEP system can be arranged hierarchically, according to priority. Unit priorities are numbers that take on integer values 1, 2, 3, etc. A unit of priority n is said to operate at level n in the system. In determining the system response, the CSM considers the output of each unit in order of decreasing priority. (The highest priority is 1.) At each unit, the CSM updates a system vote count for each class and checks to determine if any particular class has satisfied the system identification criterion to allow for an unambiguous response. A typical system identification criterion defines the winning class as the class with the largest number of votes, as long as its vote count exceeds some minimum vote count (NUMWIN) and so long as the difference between the vote count of this class and that of the "runner-up" class exceeds some pre-set minimum difference (WINDIF).

The CSM can update the system vote count in different ways. In one method, the CSM polls the system units twice, in each case starting with the highest priority unit and moving through the units in order of descending priority. In the first polling, the CSM updates the system vote count on the basis of the generalizer class list. If a winning class has not been found by the time all the generalizer class lists of the lowest priority units have been polled, then the CSM initiates a second polling of the units. It begins by thresholding the system class list and throwing out all those classes below some specified minimum vote count. Then, beginning with the highest priority units, the CSM updates the system vote count as a function of the classes in the separator class lists for these units. In general, the appearance of a class in the separator class list causes the system vote count for that class to be decremented by 1. Again, after a unit's separator class list has been used to update the system vote count, if a winning class has not been found, then the unit of next lowest priority is processed.

Figure 3:
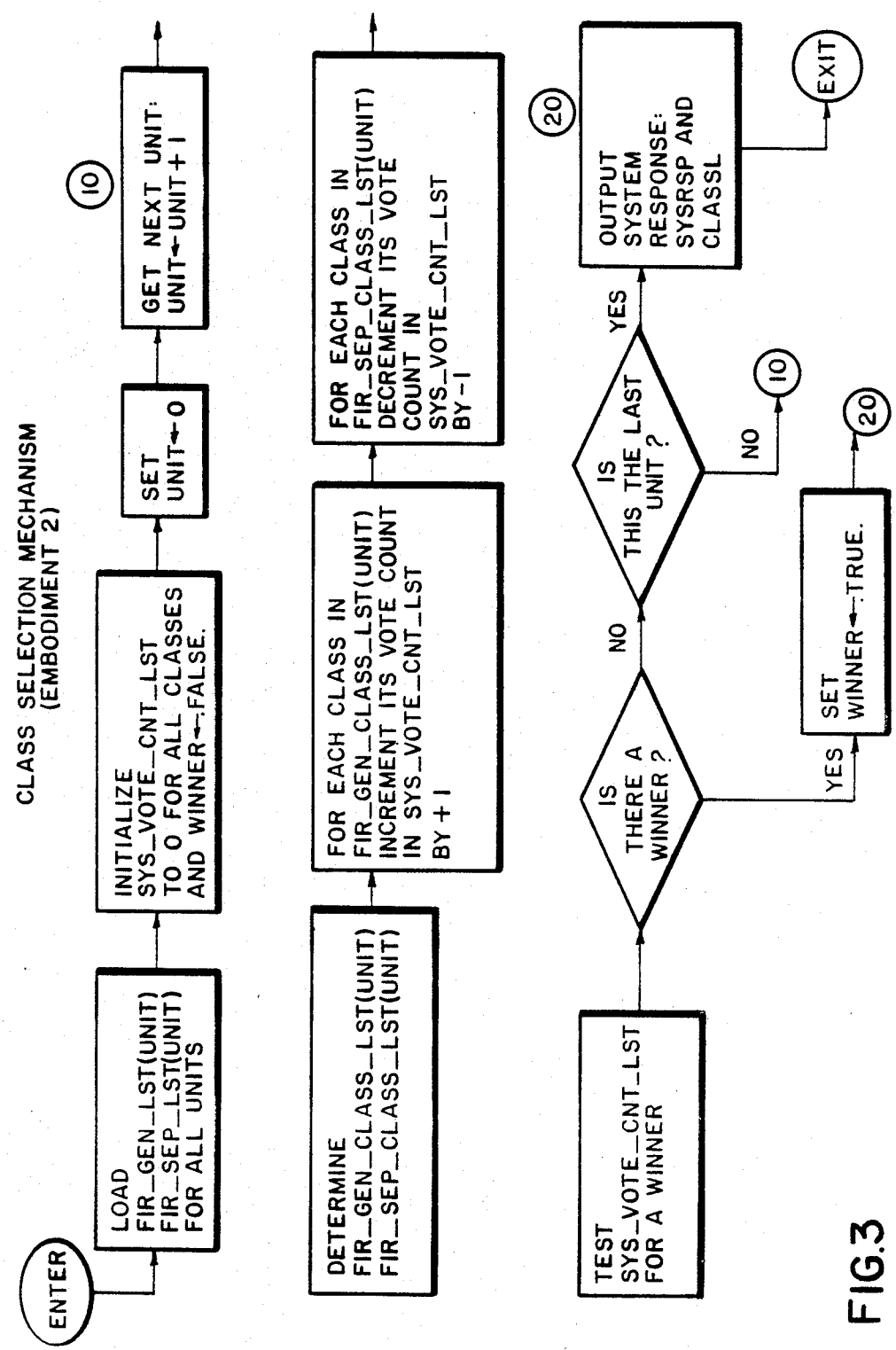
FIG. 3 is a flow diagram depicting an algorithm for a software system (Nestor System ®) implementing the adaptive pattern classification system of FIG. 1 according to a second preferred embodiment of the present invention.

In another embodiment of the system, shown in FIG. 3, the CSM polls each unit only once. The system vote count is updated as a function of the net number of votes for a class given the composition of both the generalizer and the separator class lists for the given unit. For example, the appearance of a class in the generalizer class list would increment its system vote count by 1; the appearance of a class in the separator class list would reduce its vote by 1. In such an embodiment, the system tends to rely less upon correlations between unit responses as a means of distinguishing classes and more on the internal discriminating ability of individual coding units at the level of single feature distinctions.

D3. Types of System Response

Figure 4:
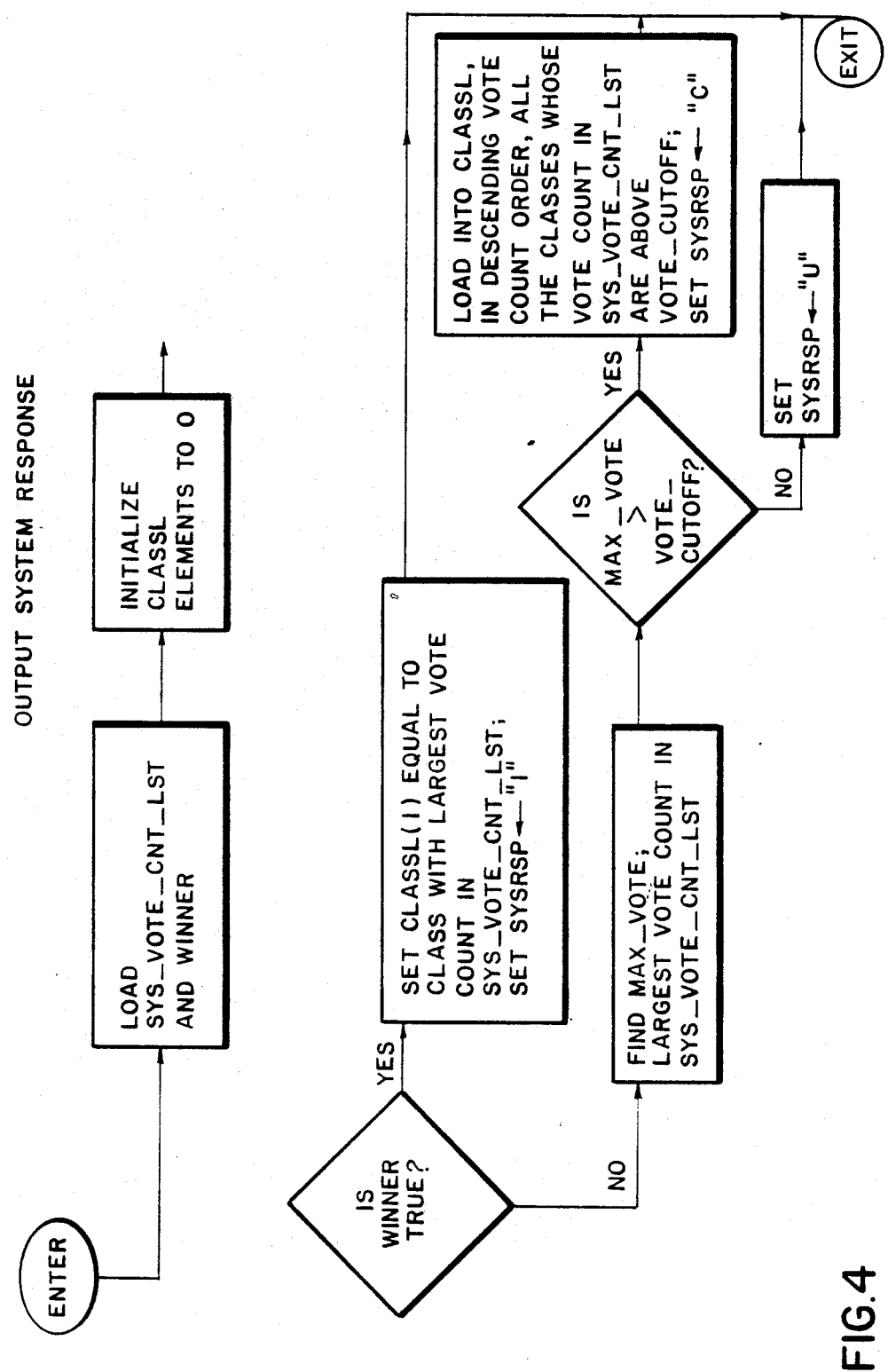
FIG. 4 is a flow diagram depicting an algorithm for producing the output response in the adaptive pattern classification system of FIG. 1.
Figure 5A:
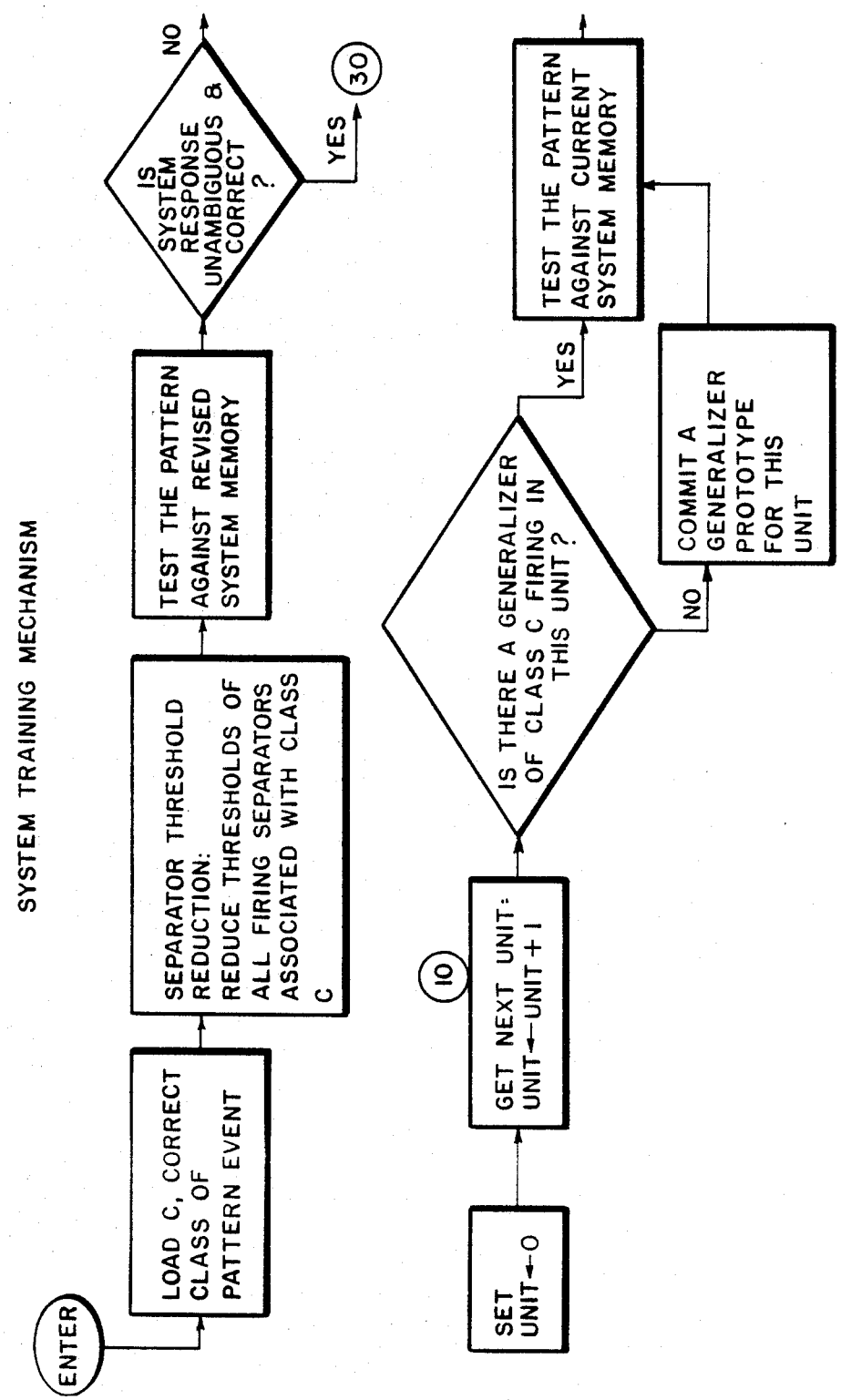
FIG. 5 (comprised of FIGS. 5a and 5b) is a flow diagram depicting the system training mechanism for modifying the memory in the classification units of the adaptive pattern classification system of FIG. 1.
Figure 5B:
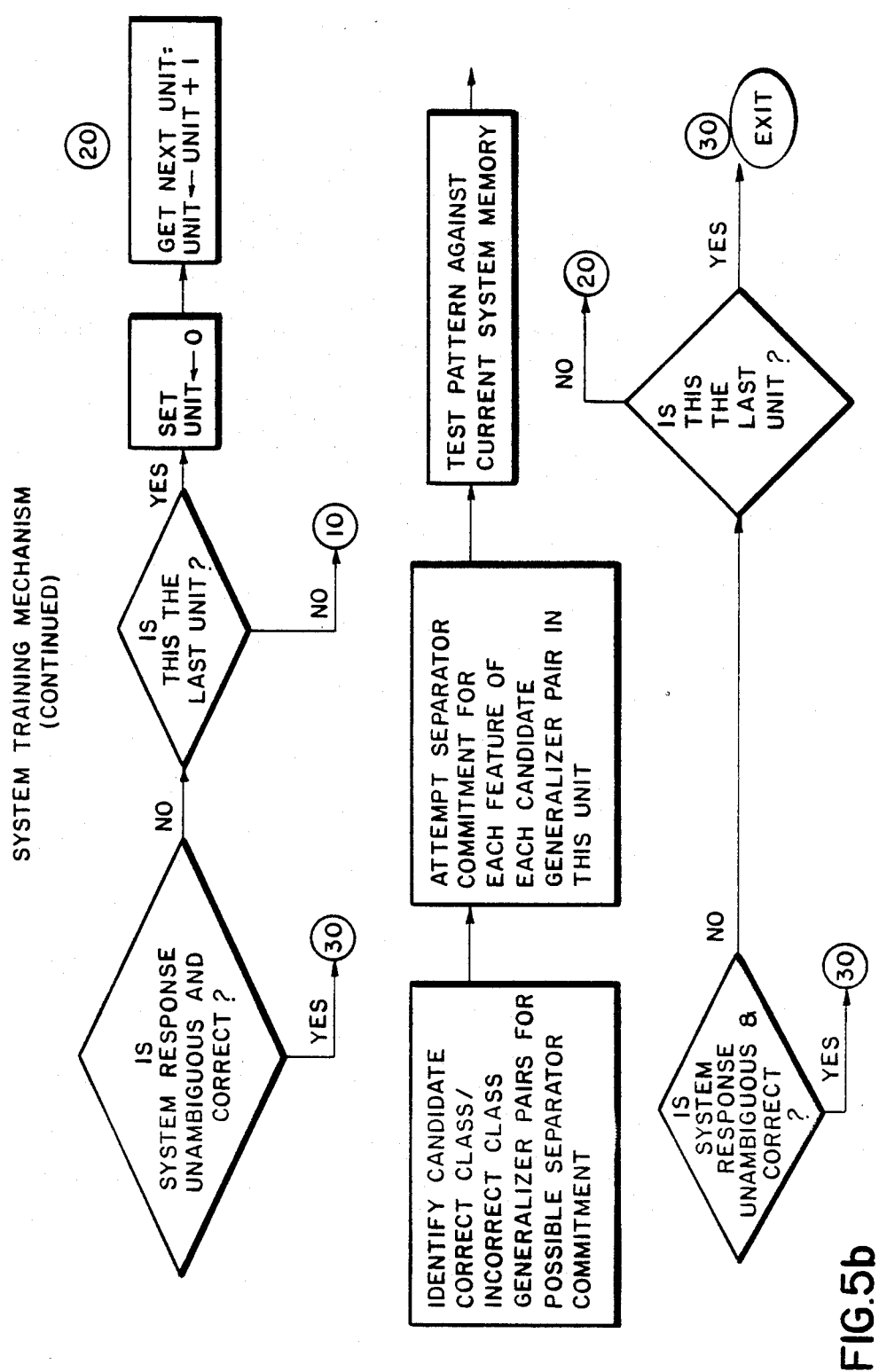

As in the multi-unit Nestor System described in the above-referenced patent application, the GENSEP system offers, as a final output, a system class list (CLASSL) and a response type (SYSRSP). The CSM assembles the class list from the winning class (if it exists) or from all the classes that are tied for the largest vote count (or alternatively, all the classes with vote count above some preset minimum listed in CLASSL in descending vote order). If there is a unique winning class, then the response type is "Identified" (SYSRSP="I"). If there is no winning class but there is a set of classes in CLASSL, then the response type is "Confused" (SYSRSP="C"). The set of classes appearing in CLASSL is called the "confusion set." If no classes appear in CLASSL (no prototypes fired in any of the coding units), then the response type is "Unidentified" (SYSRSP="u"). A flow chart of this algorithm for producing the outputs CLASSL AND SYSRSP is shown in FIG. 4.

E. Training the System

Training the GENSEP system requires a specification of the true identity of the pattern, the output response of the system and the representations of the input pattern. The mechanisms of training are (1) the commitment of new generalizer prototypes; (2) the adjustment (enlargement) of generalizer prototype influence fields; (3) the commitment of separator prototypes and (4) the adjustment (reduction) of separator prototype influence fields. The object of training is to effect an internal change in the system such that, if the pattern were to be immediately represented to the system, the system's response would be, if not to correctly classify the pattern, at least to produce a confusion set that would include the correct classification. Training is orchestrated by the System Training Mechanism (STM) illustrated in FIG. 5.

During training, patterns unidentifiable by correlation among the responses of different coding units will cause separators to be committed to memory. This occurs in an effort to find some feature or combination of features that will be useful to distinguish among the classes in question. The system may commit a host of candidate separators; those that are of no reliable predictive value will be trained out to phase II status, playing essentially no role in future system responses. The strategy can be likened to the system postulating a number of hypotheses and eliminating from use all those that prove incorrect.

E1. Reducing Incorrect Separator Influence Fields

Assume that the class of an input pattern is x. The first action of the STM is to reduce the influence fields of all firing separator prototypes whose class association is x. (Recall that, by firing, these separators are in effect saying "not x.") These separators may be firing in any of the system units. Part of the firing condition for separators is $d < \theta_s$, where d is the unmatched sign distance between a particular feature of the input pattern and the separator prototype in question. To silence the prototype, we change $\theta_s$ to $\theta'_s$, where $\theta'_s = d$. Thus $d < \theta'_s$ is no longer true, and the separator no longer fires.

E2. Commitment of Generalizer Prototypes

Once all incorrect separator prototypes have been silenced through threshold reduction, the STM activates the CSM, initiating the polling of system units in order to recompose the system response. The CSM is controlled by the STM in the following way (see FIG. 5). If a unit is polled and its generalizer class list does not contain the correct class of the input pattern, then the training mechanism commits a new prototype for this class based upon the code vector for the pattern in this unit. This prototype commitment procedure is the same as that described in the above-referenced patent application, with the exception being that the influence field is fixed at some pre-set size, generally a percentage of the dimensionality of the code space. (In previous systems the initial influence field size was a function of distance to prototypes for different classes.) Otherwise, as in previous prototype commitment procedures, the code vector of the pattern becomes the prototype vector and the class of the pattern becomes the class of the prototype.

E3. Enlargement of Generalizer Influence Fields

In some embodiments of the system, generalizer influence fields are enlarged in response to an input pattern. If the System Training Mechanism polls a unit whose generalizer class list includes the correct class, then some of the correct class generalizer prototypes may be candidates for influence field expansion. In particular, we define the growth ring of a prototype to be all those points whose unmatched sign distance with the prototype $d_r$, obeys the following inequality:

$$\gamma\theta_g < D_r < \theta_g$$

where $\theta_g$ is the threshold defining the influence field of the generalizer, and $\gamma$ is some real number on the interval (0, 1). (A typical value for $\gamma$ is on the interval [0.80, 0.90].

Consider the set of firing generalizers in a unit whose class matches the category of the pattern. If there is at least one prototype whose influence field contains the pattern but whose growth ring does not, then no prototypes for that class will be enlarged, regardless of whether the pattern falls within their growth rings or not. On the other hand, if there exists no correct class prototype that contains the pattern in its influence field but not in its growth ring, then all the correct class prototypes whose growth rings contain the pattern are expanded. All will have their influence fields expanded so that the pattern falls just outside the growth ring (but within the influence field) of each of them. In particular, if initially for the $i^{th}$ firing generalizer:

$$d_r^i = \delta \theta_g^i$$

where $\gamma < \delta < 1$ then $\theta_g^i \rightarrow \theta'_g^i$ such that $\theta'_g^i = d_r^i/\gamma$ Thus, if the pattern were to be immediately represented, none of these generalizer prototypes would have their influence fields further enlarged.

E4. Commitment of Separator Prototypes

If, after recomposing the system response based upon firing generalizer prototypes, the system is still confused, then the System Training Mechanism attempts to commit separator prototypes between pairs of generalizers from the same unit whose classes are represented in the system confusion set. Each such pair is constituted from a firing generalizer for the correct class and a firing generalizer for some other class in the system confusion set. When the STM is attempting separator commitment for such a "correct-class, opposite-class" pair, it attempts to commit a pair of separators for each feature in the generalizer prototype vector pair. (Recall that a prototype vector has the same structure as the intermediate signal F (the pattern code vector) produced by a unit. F is organized into a set of signals $F_1 \ldots F_k$ each of which is regarded as a "feature.") If the two classes of the generalizers in question are A and B, then the STM is attempting to commit for each feature in the generalizer code vectors, a pair of separators, one for "not A" and one for "not B."

Assume that in the unit in question an input pattern of class $\alpha$ represented by $F=(F_1 \ldots F_k)$ Let $P(\alpha)=(P(\alpha)_1 \ldots P(\alpha)_k)$ and $P(\beta)=(P(\beta)_1 \ldots P(\beta)_k)$ be two firing generalizers for classes $\alpha$ and $\beta$. Further, assume that both $\alpha$ and $\beta$ are represented in the system confusion set. Let $d_b(P(\alpha)_j, P(\beta)_j)$ represent the binary distance between the $j^{th}$ feature values for $P(\alpha)$ and $P(\beta)$. The binary distance between real-valued features $P(\alpha)_j$ and $P(\beta)_j$ is computed by first converting each feature into its binary equivalent and subsequently performing an unmatched sign count on the resulting binary representations. A pair of separator prototypes is committed for the $j^{th}$ feature if the binary distance between $P(\alpha)_j$ and $P(\beta)_j$ exceeds some minimum amount, $\theta_s$. $\theta_s$ is the threshold for separator commitment. Thus if $d_b(P(\alpha)_j, P(\beta)_j) > \theta_s$, and no separators currently exist for this feature and this generalizer pair, then the System Training Mechanism commits a new pair of separators to system memory. Refer to them as the $m^{th}$ and $n^{th}$ separators (where $n=m+1$). If the $m^{th}$ separator is for "not $\alpha$" then it is defined as $$S_m = \{P(\alpha), P(\beta); j; s_m; \theta_m; \alpha\},$$

where $$s_m = P(\beta)_j$$

$$\theta_m = \min [d_b(P(\beta)_j, F(\alpha)_j), d_b(P(\beta)_j, P(\alpha)_j)]$$

The "not $\beta$" separator is defined by $$S_n = \{P(\alpha), P(\beta); j; s_n; v_m; \beta\}$$

where if $d_b(P(\beta)_j, F(\alpha)_j) = < d_b(P(\beta)_j, P(\alpha)_j)$ then $s_n = F(\alpha)_j$ $\theta_m = d_b(P(\beta)_j, F(\alpha)_j)$ else if $d_b(P(\beta)_j, F(\alpha)_j) > d_b(P(\beta)_j, P(\alpha)_j)$ then $s_n = P(\alpha)_j$ $\theta_m = d_b(P(\beta)_j, P(\alpha)_j)$ The System Training Mechanism uses a variety of mechanisms to select the subset of correct-class/opposite-class firing generalizers for which separator commitment is to be attempted. Let the correct class of the pattern be $C^0$. Let $[C^i]$, $i=1 \ldots N$ be the set of incorrect classes that are represented in the confusion set. Associated with $C^i$ is a set of firing generalizers $[P^j(C^i)]$, $j=1 \ldots G^i$. $G^i$ is the total number of firing generalizers for class $C^i$. The sets $$\{P^j(C^0)\} \times \{P^k(C^1)\} = P^{jk}(0,1)$$

$$\{P^j(C^0)\} \times \{P^k(C^i)\} = P^{jk}(0,i)$$

$$\{P^j(C^0)\} \times \{P^k(C^N)\} = P^{jk}(0,N)$$

form the set of all possible correct-class/opposite-class generalizers for which separator commitment is possible. In one preferred embodiment of the system, the STM attempts commitment of separators for all such generalizer pairs. In another preferred embodiment of the system, the STM attempts commitment for one member only of each of the $P^{jk}(O,i)$ sets. It identifies for each set, the closest-opposed generalizer pair member (i.e., the generalizer pair with the smallest interprototype vector distance) and attempts separator commitment only for this generalizer pair in that set. This embodiment is preferred in those situations where the number of separators committed is to be minimized.

F. Example Problem

The GENSEP system has special utility in those pattern recognition applications where class territories in a given pattern space are largely overlapping. In such cases there is much more territory in the pattern space to be covered by P2 prototypes. Consider the problem as depicted below:

| A, B | | C, D |

There, classes A and B are degenerate in one region; C and D in another. In the systems described in the above-referenced patent application, some P1 prototypes would initially be committed for the various classes and eventually so reduced in size as to become P2 prototypes. Before this happens, however, their presence as P1's would limit the size of the influence fields of additional P2's committed to the problem. (P2 prototypes in these previously described systems are committed with an initial influence field no larger than the distance to the nearest opposite class P1.) Since P2 prototypes with, on the average, small sized influence fields are being used, it will take longer for the system to completely cover the classes with prototype influence fields. Additionally, it is likely that P2 prototypes near the border of the A-B, C-D regions will have a significant amount of their influence fields lying in both class regions. This would severely compromise the ability of the system to do any class separation in this space.

In a GENSEP system, however, more effective coverage is achieved because the size of the generalizer prototypes being committed for the classes is not restricted in any way by the locations of existing prototypes. As a result, comparatively fewer prototypes are needed to cover the space and this covering can develop very rapidly (assuming a distribution of input training patterns that captures the overall statistics of the problem as reflected in the shapes of the pattern class territories.)

The additional advantage offered by GENSEP is that separators can develop to take advantage of whatever separability is possible in the space. In particular, separators will develop for the x feature component in the code vector to separate A from C, and A from D; and, as well, B from C and B from D. In the previously described systems, the only mechanism available for separation within this unit would be P1 prototypes. As has been noted, to the extent that class territories are largely overlapping (as opposed to partially overlapping) the number of P1 prototypes that survive is greatly reduced.

There has thus been shown and described a novel parallel, multi-unit, adaptive pattern classification system which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are intended to be covered by the claims which follow.

APPENDIX

Glossary of Terms

Class: A conceptual definition of a group of patterns which elicits the same response from a pattern class separator and identifier. All vector signals S representing patterns within this group will produce the identical output response R. A Nestor adaptive module does not have any preset or preconceived classes before it is trained.

Classification Unit: One of a number of conceptually (or physically) separate units of the system. These units operate in parallel, or in sequence, and each comprise both an encoding portion and a classification portion. The encoding portion transforms the vector signal S into an encoded vector signal F; the classification portion attempts to translate the vector signal F into a unique output response R identifying the class of the input pattern represented by the vector signal S. Each classification unit is designated by its own hierarchy level or "priority" within the system.

Confusion Zone: An area in multi-dimensional pattern space associated with more than one pattern class. Typically, such areas are covered with at least two overlapping layers of phase 2 prototypes, each layer being associated with a different class. In some cases, these zones may also be covered by overlapping influence fields of phase 1 prototypes for different classes.

Correlation: The selection of the correct class from among several output responses of a number of Nestor adaptive modules, each of which has been presented with an encoded vector signal F representing the same input pattern.

Encode: A transformation of an incoming vector signal S, representing an input pattern, into an encoded vector signal F, using a code "c." The transformation depends upon the presence or absence of particular features in the pattern. The purpose of the transformation is to eliminate irrelevant information contained in the signal S.

Event: A real world occurrence which may be detected and represented by a vector signal S. For example, the event may be a visual pattern, detectable by a camera, or a sound pattern, detectable by a microphone. The term "event" may be used synonymously with "pattern."

Influence Field of a Prototype: A variable-sized region or territory in the multi-dimensional pattern space centered on a prototype. Upon presentation, an input pattern that falls within this territory will cause the prototype to fire.

Neighbor Search: A search within a Nestor adaptive module for neighboring prototypes within a certain distance, in the multi-dimensional pattern space, from the point representing an input pattern.

Nestor Adaptive Module: A device or method disclosed and claimed in one or more of the following U.S. Pat. Nos.: 3,950,733; 4,044,243; 4,254,474 and 4,326,259.

Pattern: A particular set of data, resulting from a real world "event" and represented by a vector signal S, which is to be classified by a pattern class separator and identifier. Although each pattern presented to the pattern class separator and identifier may be at least slightly different from every other pattern previously presented, it can be grouped into one of an arbitrary number of classes.

Pattern Signal: A vector signal S comprised of individual scalar signals $s_1, s_2 \ldots s_k$, which represents an input pattern to a pattern class separator and identifier.

Phase 1 Prototype: A type of prototype which, when "fired," will direct the response of a Nestor adaptive module and cause a particular output response to occur.

Phase 2 Prototype: A type of prototype which, when "fired," can only indicate that an incoming pattern may fall within a designated one of a number of classes.

Prototype: A prototypical representation of a pattern as stored in a Nestor adaptive module memory. Each prototype is defined in memory by (1) a vector in the multi-dimensional pattern space; (2) a "region of influence" within the pattern space; (3) a particular pattern class with which the prototype is associated; and (4) a label specifying the phase of the prototype.

Prototype "Commitment": The establishment of a new prototype (either phase 1 or phase 2 prototype) in a Nestor Adaptive Module in association with, and as a result of the presentation of, an input pattern. Upon presentation, during training, every input pattern will either fall within the influence field of an existing prototype, or cause the formation of a new prototype.

To "Fire" a Prototype: A prototype is said to "fire" when an input pattern, represented by a vector signal S, falls within the influence field of that prototype. This causes the Nestor adaptive module, in which the prototype resides, to produce an output response.

System Level: A collection of classification units having the same priority.

Vote Counting: A correlation technique which is used when an input pattern falls within a "confusion zone" in the multi-dimensional pattern space.

System Expressions: The following expressions are defined:

```
NUM_UNIT = number of units in system
FPAT(u), u = 1 ... NUM_UNIT
  = array of pattern code vectors
SYS_VOTE_CNT_LST
  = System Vote Count List -
a list of votes, indexed on pattern
class
FIR_GEN_LST(u), u = 1 ... NUM_UNIT
  = list of firing generalizers for a
given unit
FIR_GEN_CLASS_LST(u), u = 1 ... NUM_UNIT
  = list of classes associated with
firing generalizers for a
given unit
FIR_SEP_LST(u), u = 1 ... NUM_UNIT
  = list of firing separators for a
given unit
FIR_SEP_CLASS_LST(u), u = 1 ... NUM_UNIT
  = list of classes associated with
```

What is claimed is:

1. In a system for classification and identification of patterns, each pattern being represented by an input signal S, said system comprising at least one classification unit $U_i$ including:

(1) pattern feature encoding means, responsive to said signal S, for producing an intermediate signal F, comprised of signal components $F_1, F_2 \ldots F_i \ldots F_k$, representative of features contained in the pattern represented by said signal S; and (2) pattern classification means, responsive to said intermediate signal F, for producing an output signal $R_i$ representative of a proposed respective class of said pattern represented by said signal S as identified by the features represented by said intermediate signal F;

the improvement wherein said pattern classification means include:

(a) generalizer means comprising:
  (i) memory means for storing a plurality of generalizer prototypes within a multi-dimensional pattern space, each generalizer prototype including, as prototype information stored in said memory means: a vector location in said pattern space; a scalar distance, in a given range between a minimum and maximum value, defining the size of a region of influence about said vector location of said generalizer prototype; and a particular class with which said generalizer prototype is associated; and
  (ii) means for comparing the vector location of an input pattern, represented by said intermediate signal F, with a plurality of said generalizer prototypes stored in said memory means to determine whether said input pattern location falls within a region of influence of at least one of said generalizer prototypes, and for producing a generalizer output classification response, indicative of the class associated with said at least one generalizer prototype, if said input pattern location falls within the region of influence thereof;

(b) separator means comprising:
  (i) memory means for storing a plurality of separator prototypes within said pattern space, each separator prototype including, as prototype information stored in said memory means: a vector location in said pattern space; a scalar distance defining the size of a region of influence about said vector location of said separator prototype; a particular class with which said separator prototype is associated; the identity of a pair of generalizer prototypes with which said separator prototype is associated; and an index specifying a portion of the signal components $F_1, F_2 \ldots F_i \ldots F_k$ of the pattern space holding the generalizer prototypes with which said separator prototype is associated;
  (ii) means for comparing the location of an input pattern, represented by the signal components of said intermediate signal F identified by the respective index of a separator prototype, with at least one of said separator prototypes stored in said memory means to determine whether said input pattern location falls within a region of influence of such separator prototype, and for producing a separator output classification response, indicative the class of said input pattern, if said input pattern location falls within the region of influence of such separator prototype; and (c) polling means, responsive to said generalizer means and said separator means, for producing a classification unit output signal $R_i$, in dependence upon said generalizer and separator output classification responses;

thereby to identify patterns which fall within the regions of influence of a plurality of generalizer prototypes.

2. The system defined in claim 1, wherein said generalizer means further include means for modifying said scalar distance defining the size of a region of influence of each generalizer prototype, within said given range, when said system is in a training mode.

3. The system defined in claim 1, wherein said maximum value defines a region of influence for the respective generalizer prototype of approximately five percent to fifty percent said pattern space.

4. The system defined in claim 1, wherein each generalizer prototype further includes, as prototype information stored in said generalizer memory means, a set of weighting factors $(W_1, W_2 \ldots W_i \ldots W_k)$, one for each respective component $(F_1, F_2 \ldots F_i \ldots F_k)$ of said intermediate signal F, and wherein said pattern classification means further include means for multiplying each intermediate signal component $F_i$ by the respective, associated weighting factor $W_i$ or means for performing a bit comparison between the input signal $F_i$ and the weighting factor $W_i$, to produce a weighted signal component $F'_i$ for comparison by said comparing means.

5. The system defined in claim 1, further comprising means for adjusting said generalizer weighting factors, when in a training mode, to modify the output classification response $R_i$ of said pattern classification means.

6. The system defined in claim 1, wherein said separator means further include means for modifying said scalar distance defining the size of a region of influence of each separator prototype, when said system is in a training mode.

7. The system defined in claim 1, wherein each separator prototype further includes, as prototype information stored in said separator memory means, a set of weighting factors $(W_1, W_2 \ldots W_i \ldots W_k)$, one for each respective component $(F_1, F_2 \ldots F_i \ldots F_k)$ of said intermediate signal F, and wherein said pattern classification means further include means for multiplying each intermediate signal component $F_i$ by the respective, associated weighting factor $W_i$, or means for performing a bit comparison between the input signal $F_i$ and the weighting factor $W_i$, to produce a weighted signal component $F'_i$ for comparison by said comparing means.

8. The system defined in claim 7, further comprising means for adjusting said separator weighting factors, when in a training mode, to modify the output classification response $R_i$ of said pattern classification means.

9. The system defined in claim 1, wherein each pattern classification means which comprise generalizer means and separator means further include means for determining the pair of generalizer prototypes associated with each separator prototype.

10. The system defined in claim 1, wherein said system includes a plurality of said classification units $U_1, U_2, \ldots U_i, \ldots U_k$ which produce output signals $R_1, R_2, \ldots R_i \ldots U_k$, respectively, and wherein paid system includes class selection means, responsive to all of said output signals $R_1, R_2, \ldots R_i \ldots R_k$, for producing a single output response R representing the class of said pattern.

11. A method for classification and identification of patterns in a system comprising input means for receiving an input signal F comprised of signal components $F_1, F_2 \ldots F_i \ldots F_k$ representing each input pattern as a location in a multi-dimensional pattern space, memory means for storing information, and computer means connected to said input means and to said memory means, said method comprising the steps of:

(a) storing in said memory means a plurality of generalizer prototypes within said multi-dimensional pattern space, each generalizer prototype including, as prototype information stored in said memory means: a vector location in said pattern space; a scalar distance, in a range between minimum and maximum value, defining the size of a region of influence about said vector location of said generalizer prototype; and a particular class with which said generalizer prototype is associated;

(b) comparing the location of an input pattern, represented by said input signal F, with a plurality of said generalizer prototypes stored in said memory means to determine whether said input pattern location falls within a region of influence of at least one of said generalizer prototypes;

(c) producing a generalizer output classification response, indicative of the class associated with said at least one generalizer prototype, if said input pattern location falls within the region of influence thereof;

(d) storing in said memory means a plurality of separator prototypes within said pattern space, each separator prototype including, as prototype information stored in said separator memory means: a vector location in said pattern space; a scalar distance defining the size of a region of influence about said vector location of said separator prototype; a particular class with which said separator prototype is associated; the identity of a pair of generalizer prototypes with which said separator prototype is associated; and an index specifying a portion of the signal components $F_1, F_2, \ldots F_i \ldots F_k$ of the pattern space holding the generalizer prototypes with which said separator prototype is associated;

(e) comparing the location of an input pattern, represented by the signal components of said input signal F identified by the respective index of a separator prototype, with at least one of said separator prototypes stored in said memory means to determine whether said input pattern location falls within a region of influence of such separator prototype;

(f) producing a separator output classification response, indicative of the pattern class, if said input pattern location falls within the region of influence such separator prototype; and (g) producing an output signal $R_i$, indicative of the class of the input pattern represented by said input signal $F_i$, in dependence upon said generalizer and separator output classification responses;

thereby to identify patterns which fall within the regions of influence of a plurality of generalizer prototypes.

12. The method defined in claim 11, further comprising the step of modifying said scalar distance defining the size of a region of influence of each generalizer prototype, within said given range, while in a training mode.

13. The method defined in claim 11, wherein said maximum value defines a region of influence for the respective generalizer prototype of approximately five percent to fifty percent of said pattern space.

14. The method defined in claim 11, wherein each generalizer prototype further includes, as prototype information stored in said memory means, a set of generalizer weighting factors $(W_1, W_2 \ldots W_i \ldots W_k)$, one for each respective component $(F_1, F_2 \ldots F_i \ldots F_k)$ of said input signal F, and wherein said method further comprises the step of multiplying each input signal $F_i$ by the respective, associated, generalizer weighting factor $W_i$ or of performing a bit comparison between the input signal $F_i$ and the weighting factor $W_i$, to produce a weighted signal $F'_i$ for utilization in said comparing step.

15. The method defined in claim 14, further comprising the step of adjusting said generalizer weighting factors, when in a training mode.

16. The method defined in claim 11, further comprising the step of modifying said scalar distance defining the size and region of influence of each separator prototype, when in a training mode.

17. The method defined in claim 11, wherein each separator prototype further includes, as prototype information stored in said memory means, a set of separator weighting factors $(W_1, W_2 \ldots W_i \ldots W_k)$, one for each respective component $(F_1, F_2 \ldots F_i \ldots F_k)$ of said input signal F, and wherein said method further includes the step of multiplying each input signal component $F_i$ by the respective, associated, separator weighting factor $W_i$ or of performing a bit comparison between the input signal $F_i$ and the weighting factor $W_i$, to produce a weighted signal component $F'_i$ for utilization in said comparing step.

18. The method defined in claim 17, further comprising the step of adjusting said separation weighting factors, when in a training mode.

19. The method defined in claim 11, further comprising the step of determining the pair of generalizer prototypes associated with each separator prototype.

* * * * *